Patented June 5, 1923.

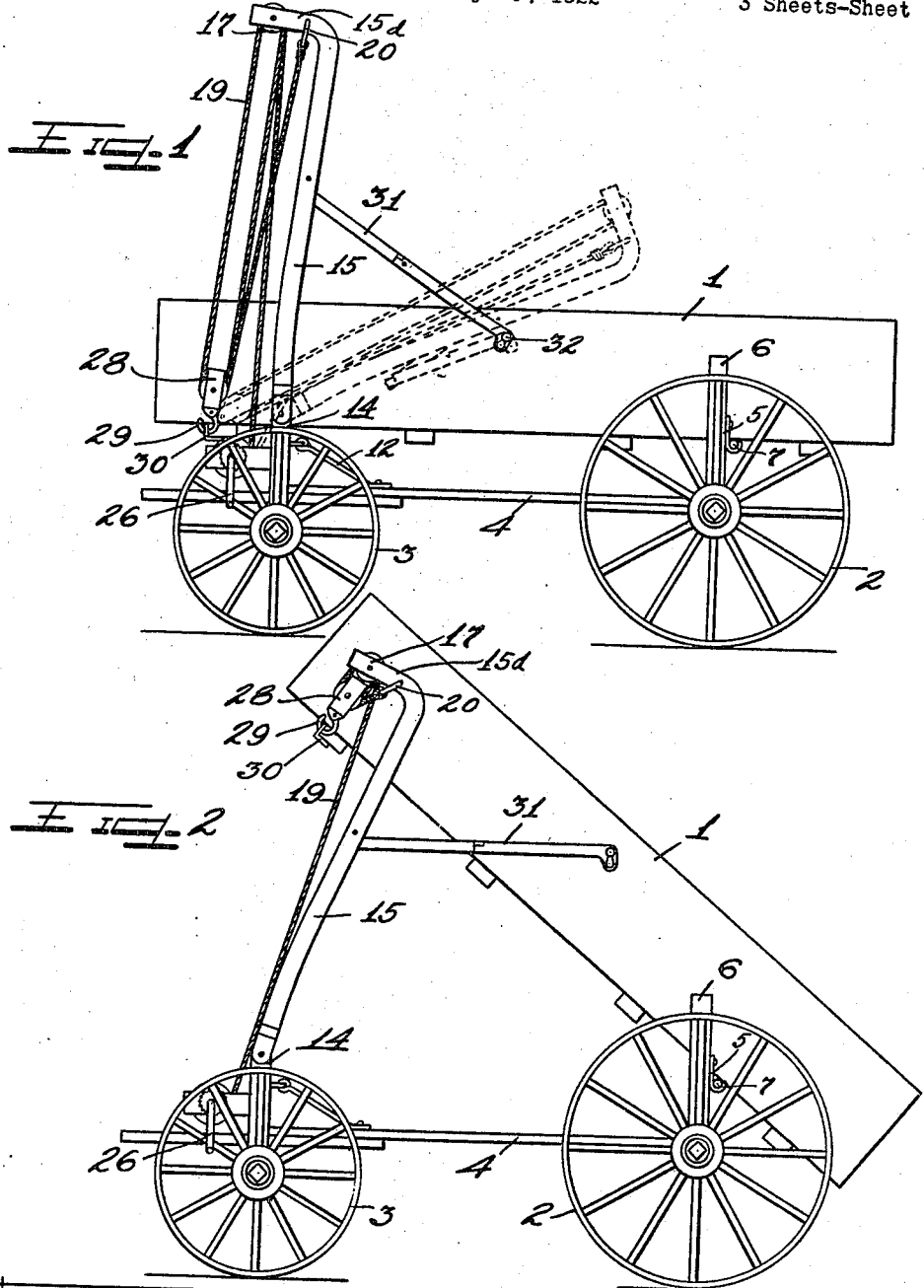
June 5, 1923.
A. F. JANSEN
1,457,575
DUMPING ATTACHMENT FOR FARM WAGONS
Filed July 10, 1922
3 Sheets-Sheet 1

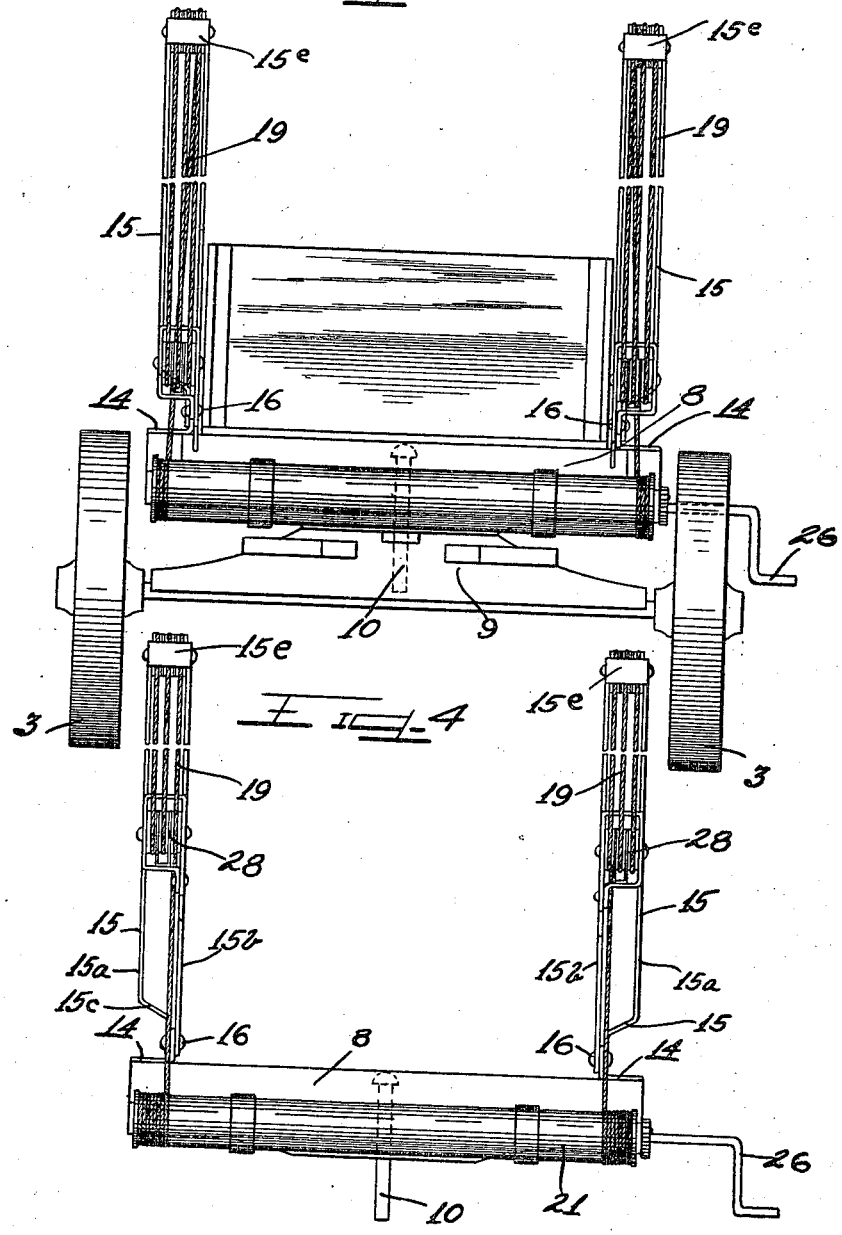

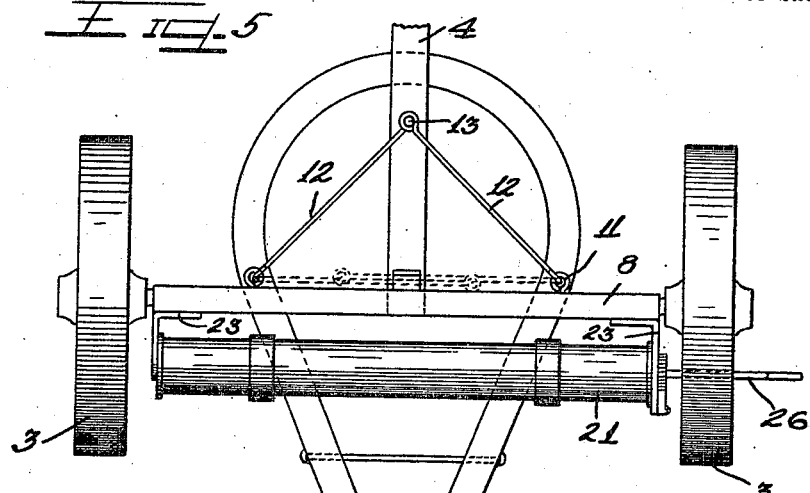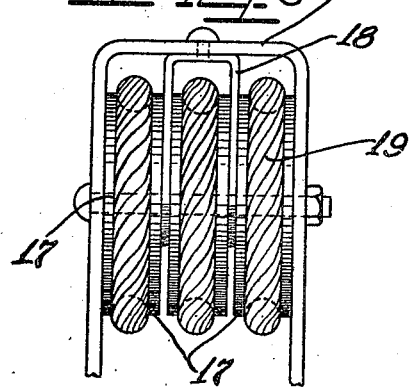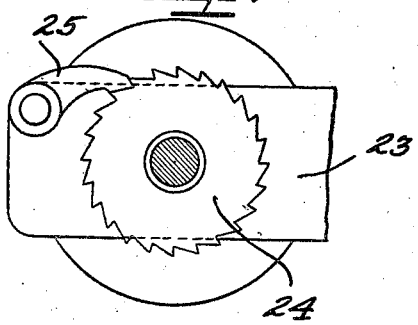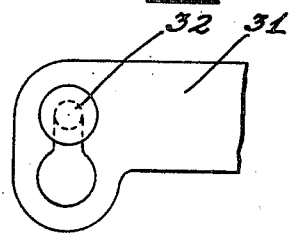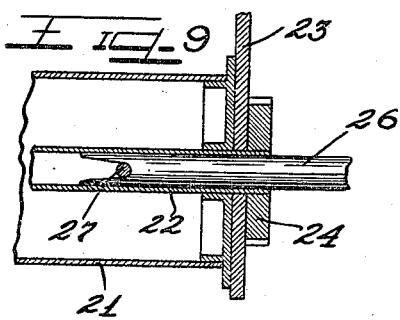

1,457,575

UNITED STATES PATENT OFFICE.

ANTON F. JANSEN, OF DOUGLAS, ILLINOIS.

DUMPING ATTACHMENT FOR FARM WAGONS.

Application filed July 10, 1922. Serial No. 573,895.

*To all whom it may concern:*

Be it known that I, ANTON F. JANSEN, a citizen of the United States, and a resident of the town of Douglas, in the county of Effingham and State of Illinois, have invented certain new and useful Improvements in a Dumping Attachment for Farm Wagons; and I do hereby declare that the following is a full, clear, and exact description of the same, reference being had to the accompanying drawings, and to the numerals of reference marked thereon, which form a part of this specification.

This invention relates to a dumping attachment which is adapted to be applied to a farm wagon or the like, and it is an object of this invention to provide a novel dumping attachment that can readily be applied or removed from a wagon and which can be folded along the sides of the wagon.

This invention comprises the novel structure and combinations hereinafter described and more particularly pointed out and defined in the appended claims.

In the accompanying drawings which illustrate a preferred embodiment of this invention and in which similar reference numerals refer to similar features in the different views:

Figure 1 is a side elevational view of a farm wagon showing my attachment applied thereto and showing in dotted lines how the same can be folded.

Figure 2 is a side elevational view of a farm wagon raised to dumping position by my novel attachment.

Figure 3 is a front and enlarged elevational view of the farm wagon with the attachment applied thereto.

Figure 4 is a front and enlarged elevational view of the attachment.

Figure 5 is a top plan view of the front truck of a farm wagon showing my attachment applied thereto, with parts omitted.

Figure 6 is an elevational view of the upper pulley sheath or block upon an enlarged scale.

Figure 7 is an enlarged elevational view of the retaining means.

Figure 8 is an enlarged fragmentary view of the end of a strut.

Figure 9 is an enlarged sectional view through the operating mechanism.

In referring now to the drawing, it will be observed that there has been illustrated the typical farm wagon comprising the body 1 which rests upon the usual bolsters supported by the wheels 2 and 3, and having the reach rod 4; but it should be understood that my invention is not limited to any particular type of wagon. In order to convert such a wagon into a dumping wagon, hook members 5 are secured to the rear side supports 6 for receiving the ends of a rod 7 secured transversely to the bottom of the body and which acts as a pivotal support for the body when it is raised by the hoisting or dumping attachment. Then the usual front bolster is removed and a new bolster supporting my novel hoisting attachment is substituted therefor, and the front part of the body is suitably connected to the hoisting mechanism.

My novel hoisting attachment comprises a front bolster 8 which is adapted to be supported upon the usual axle block 9 (Figure 3) by means of the king pin 10. The rear side of the bolster 8 is provided with a pair of eyes 11 (Figure 5) for securement to the rods 12 which are removably connected to a common stud 13 on the reach rod for preventing the bolster 8 from tilting when the wagon body is raised therefrom. These rods 12 may be readily unhooked from the pivot 13 and folded upon the bolster as shown in dotted lines in Figure 5, when it is desired to remove the bolster 8. Angle clips 14 are secured to the top of the bolster 8 adjacent the ends thereof, and hoisting standards 15 are pivoted to the upstanding flanges of said angle clips by means of the pivots 16.

Each hoisting standard 15 comprises a pair of spaced metal members $15^a$ and $15^b$; the member $15^a$ being made with an inclined angle $15^c$ above the pivot 16 in order to bring the lower part adjacent the angle clip. The upper ends of the members $15^a$ and $15^b$ are provided with forwardly extending parts $15^d$ which may be held in spaced relation and united by a transverse piece $15^e$. It is however immaterial whether these hoisting standards are made from an integral strip of metal or whether they are made in parts. A plurality of grooved rollers or pulleys 17 (three in the present instance), are supported in the forwardly extending part of each standard upon a pivot bolt and a member 18 (Figure 6) in the form of a yoke secured to the transverse piece $15^e$ with its arms extending between adjacent pulleys cooperates with the transverse piece 15ᵉ to maintain the hoisting cable 19 thereof in proper position with respect to the pulleys, the whole constituting an upper tackle-block.

One end of each hoisting cable 19 is secured upon a hook or support 20 fastened to the forwardly projecting part of the hoisting standard, the cable is then trained over the pulleys 17 and similar pulleys in a tackle-block 28 having a depending hook member 29. The other end of each cable is then anchored to a rotatable drum 21 provided with an axially extending hollow trunnion 22 (Figure 9) journalled at its ends in brackets 23 secured to the bolster 8 (Figure 5). One end of the trunnion 22 has rigidly secured thereon a ratchet wheel 24 which cooperates with a pawl 25 pivoted to the bracket 23 (Figure 7) for preventing reverse rotation of the drum. The drum is adapted to be manually rotated by means of a hand crank 26 which may be inserted in the hollow trunnion 22, the inner end of said crank being bifurcated for engaging a pin 27 extending transversely through the trunnion 22. It is therefore apparent that rotation of the crank 26 in the proper direction will wind up the cable on the drum and raise the tackle blocks 28. The tackle blocks 28 are adapted to be hooked or attached on opposite sides of the body of the wagon to a transverse member 30 by means of the attaching hooks 29 engaging apertures in the ends of the transverse member, so that the body of the wagon may be raised with the tackle blocks.

Each hoisting standard 15 is supported in upright position by means of a foldable strut or brace 31 pivotally attached at one end to the upper portion of the standard and provided with a bayonet slot at its other end for removably engaging a stud 32 projecting from the side of the body. Each brace 31 consists of a pair of sections pivotally connected so as to flex in one direction; in the present instance one section being provided with a lower lip extending transversely under the other section to provide a brace that only flexes downwardly.

By folding the braces 31 downwardly the hoisting standards may be swung rearwardly upon the pivotal supports as shown in dotted lines in Figure 1. When it is desired to elevate the wagon body for dumping the contents therefrom, the hoisting standards are swung into upright positions, and the braces 31 are straightened. Then by operating the crank 26, the cable will be wound upon the drum, thereby raising the tackle blocks 28 and wagon body supported thereby, as shown in Figure 2.

The hoisting attachment may be removed from the wagon by removing the braces 31 from the studs 32 through the bayonet slots, and removing the bolster 8 whereby the parts may be compactly folded together with the tackle blocks 28 attached to the brackets 23.

It is also apparent that the hoisting attachment may be readily applied to any farm wagon or similar conveyance by simply removing the usual bolster and substituting the bolster 8 carrying the hoisting attachment therefor, and attaching the braces to the sides of the body and applying the transverse member 30 beneath the front end of the body and applying the rear transverse pivotal support 7 that sustains the body during its tilting movements.

It will accordingly be apparent that a novel form of hoisting attachment has been devised which may be readily applied to existing vehicles and which may be swung rearwardly into inclined position along the sides of the body of the vehicle.

I am aware that numerous details of construction may be varied through a wide range without departing from the principles of this invention, and I therefore do not purpose limiting the patent granted otherwise than necessitated by the prior art.

I claim as my invention:

1. The combination with a wagon body, of a front bolster therefor, hoisting standards pivoted to said bolster on opposite sides of the body, foldable braces connecting said standards with said wagon body, upper tackle-blocks carried by said standards, lower tackle-blocks depending therefrom and connectible with said body, cables operatively connecting said tackle-blocks, and a winding drum supported by said bolster for winding the cables thereon for raising the lower tackle-block.

2. The combination with a wagon body, of a front bolster therefor, hoisting standards pivoted to the ends of said bolster, flexible braces connecting said standards to said body whereby said standards may be swung rearwardly alongside the body of the vehicle.

3. A dumping attachment adapted to be applied to a wagon, comprising a front bolster, a pair of spaced hoisting standards pivoted to said bolster, foldable braces connected to said standards, a winding drum secured to said bolster, movable tackle-blocks, and cables connecting said standards, tackle-blocks and winding drum.

4. A dumping attachment adapted for dumping a vehicle body, comprising a removable bolster for supporting said body, a pair of standards secured to said bolster, braces removably secured to said body for supporting said standards, and hoisting mechanism carried by said standards for elevating said body.

5. A dumping attachment adapted for dumping a vehicle body, comprising a bolster for supporting said body, hoisting standards secured to said bolster, a winding drum secured to said bolster, and hoisting mechanism carried by said standards and operable by means of said winding drum.

In testimony whereof I have hereunto subscribed my name in the presence of two subscribing witnesses.

ANTON F. JANSEN.

Witnesses:
DAVID B. CREWS,
BERNARD J. JANSEN.